United States Patent [19]

Pappas

[11] 4,093,830

[45] June 6, 1978

[54] KEY TELEPHONE SYSTEM LINE CIRCUIT

[75] Inventor: Jeffrey Pappas, Morden, Canada

[73] Assignee: Vortex Design Ltd., Canada

[21] Appl. No.: 760,747

[22] Filed: Jan. 19, 1977

[51] Int. Cl.² ............................................. H04M 1/72
[52] U.S. Cl. ................................... 179/99; 179/84 A
[58] Field of Search ................... 179/81 C, 84 L, 99, 179/81 R, 84 R

[56] References Cited

U.S. PATENT DOCUMENTS

| | | | |
|---|---|---|---|
| 3,239,610 | 3/1966 | Morse et al. | 179/99 |
| 3,283,083 | 11/1966 | Mac Leod | 179/99 |
| 3,436,488 | 4/1969 | Barbato | 179/99 |
| 3,647,983 | 3/1972 | Fitzsimmons et al. | 179/99 |
| 3,764,752 | 10/1973 | Yachabach | 179/99 |
| 3,766,325 | 10/1973 | Hatfield et al. | 179/99 |
| 3,952,169 | 4/1976 | Vincent | 179/99 |
| 4,004,106 | 1/1977 | Yachabach et al. | 179/99 |

OTHER PUBLICATIONS

"Model CE 400 KTU Line Card"; Technical Practices Bulletin C-303.001 Issue 2; Cook Electric Company; Sep. 1973.
"ITT 400 E Key Telephone Unit"; Specification KSP4-0-00E; International Telephone and Telegraph Corp.; Aug. 1973.
"General Electric Optoelectronics Manual"; General Electric Company; 1976; pp. 70-72.

*Primary Examiner*—Kathleen H. Claffy
*Assistant Examiner*—Randall P. Myers
*Attorney, Agent, or Firm*—Allegretti, Newitt, Witcoff & McAndrews

[57] ABSTRACT

A line card circuit providing supervisory functions in a key telephone system is disclosed. Two multi-contact relays perform all of the switching functions required to operate the audible and visual signaling devices used to indicate incoming calls, busy lines, and held calls, and to switch a shunt impedance across the line conductors to maintain line current when a call on that line is being held. Ringing voltage and line current are sensed by semiconductors which comprise the combination of light-emitting diodes and an adjacent light-responsive semiconductor switch. These optical semiconductors are interconnected with other semiconductor devices to form a logic circuit for actuating the two control relays, and for disabling the line current detection circuit when the associated line is being held.

3 Claims, 3 Drawing Figures

KEY TELEPHONE SYSTEM LINE CIRCUIT

BRIEF SUMMARY OF THE INVENTION

This invention relates to line circuits for use in key telephone systems.

Many telephone subscribers, notably small businesses, require several telephone sets on the same premises, and require access to more than one line to the central office. Key telephone equipment serves such subscribers by providing a private telephone system which requires no attendant. Manually operated push-buttons on the face of the key telephones allow the user to select a desired central office line, established talking connections with other local telephone sets without using a central office line, and hold and transfer active calls.

Control circuits are used to perform a variety of supervisory functions in a key telephone system. Steady and intermittent signals, both audible and visual, are operated by these control circuits to indicate incoming calls, busy lines, and held calls. The control circuits also include means for detecting ringing signals from a central office and for maintaining line current when an active call is being held.

A single control circuit is normally associated with each of the central office lines. These line circuits are typically fabricated on modular, plug-in, printed-wire circuit boards commonly called "line cards". In this way, additional central office lines can be added to the key telephone system merely plugging in additional cards.

Although line cards are standard components which have been long employed in key components which have been long employed in key telephone systems, numerous different line card circuits have been developed over the years. These line card circuits perform essentially the same function and, by design, are typically made to be physically and functionally interchangeable in the telephone system. Examples of prior line card circuits of this class are described in U.S. Pat. No. 3,436,488 which isued on Apr. 1, 1969 to R. E. Barbato et al., and in U.S. Pat. No. 3,647,983 which issued on Mar. 7, 1972 to Alan R. Fitzsimmons et al.

The present invention is an improved and simplified line card circuit which is compatible with standard key telephone systems, functions more reliably than prior line cards, is less expensive to construct, contains fewer components, consumes less operating current, and also has faster function switching time.

According to a principal feature of the invention, optical semiconductor devices are employed to sense both line current and ringing signals. These optical semiconductor devices are interconnected with other semiconductor devices to form a control circuit for actuating two relays, each of which is independently energized or deenergized to provide the switching functions needed to control the system in the four different line conditions: idle, ringing, seized and hold.

In accordance with the invention, a first optical semiconductor device is connected across the line (or between one conductor of the line and ground) to detect ringing signals and to energize a first of the two relays in response thereto. The input circuit of a second optical semiconductor device is connected in series with the line to energize both relays in response to the presence of line current, and a transistor switching circuit connected to a control conductor from the telephone station set is employed to disable the second optical semiconductor device and to energize the second relay when the key telephone is in the seized condition.

The improved semiconductor line card circuit, being compatible with integrated circuit construction techniques and requiring only two relays, provides a significant reduction in line card manufacturing costs. The use of fewer relays and relay contacts, together with the elimination of potentially damaging inductive voltage build-ups during current surge conditions, provides a significant increase in reliability and reduces the cost of system maintenance.

BRIEF DESCRIPTION OF THE DRAWINGS

These and other features and advantages of the present invention will become more apparent through a consideration of the following detailed description. In the course of this description, reference will be frequently made to the attached drawings in which:

FIG. 2 is a chart which depicts the characteristics of the four line conditions and the corresponding states of the two controlled relays during these conditions.

DESCRIPTION OF THE PREFERRED EMBODIMENT

Figure 1:
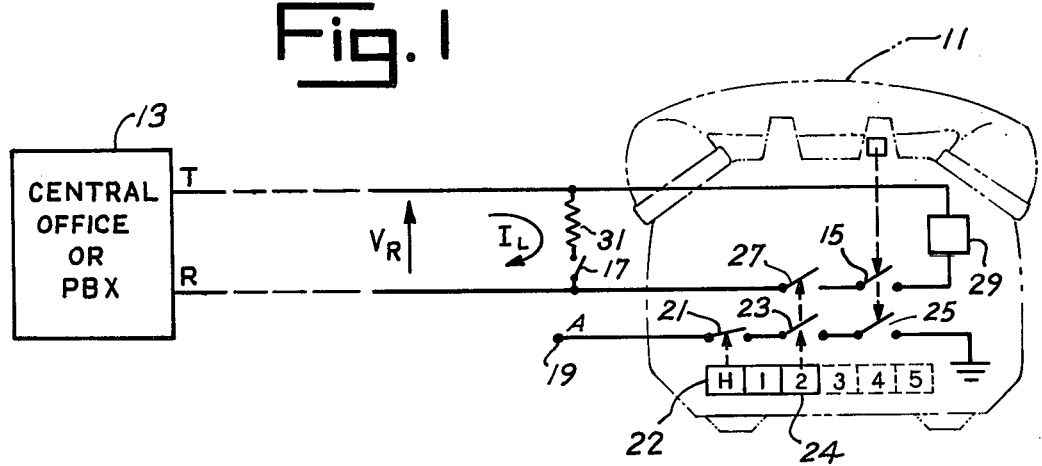
FIG. 1 is a simplified schematic employed to illustrate the four telephone line conditions to which a line card circuit must respond.

FIG. 1 of the drawings illustrates the various conditions to which a line card circuit must respond in order to control and supervise the operation of the key telephone system with respect to each line to the central office (or to a PBX/PABX). Briefly, the four different system states to which the line card circuits must respond, and in part control, may be individually described as follows:

Idle.

When the line from the telephone substation 11 to the central office 13 is totally inactive, no line current $I_L$ flows because the telephone is "on hook" and the hook switch 15 is open. In addition, the switch 17 is closed only during the hold condition (to be discussed). No ringing signal voltage $V_R$ is present during the idle condition and the control terminal 19 (connected to what is commonly called the "A conductor") is ungrounded. The A conductor terminal 19 is connected to the three switches 21, 23 and 25 within the telephone station set. Switch 21 is normally closed and is opened only when the hold key 22 on the telephone is depressed. Switch 23 is closed whenever the line select key 24 is depressed. Key 23 in the illustration of FIG. 1 is used to select the second of five lines to the central office. Finally, switch 25 is closed whenever the telephone is off-hook. Thus, terminal 19 is not grounded in the idle condition because (at least) switch 25 is open.

Ringing.

The ringing condition occurs when ringing voltage $V_R$ is applied to the line at the central office 13, indicating an incoming (but still unanswered) call. The line to the central office comprises a pair of wires commonly known as the "tip" and "ring" conductors, often called simply the "T" and "R" leads. (By applying the ringing voltage to different leads it is possible to selectively ring one of a pair of party-line telephones which share a single central office line.) The line card must provide means for detecting such ringing signals and for closing switch contacts to actuate audible and/or visual annunciating devices (typically an intermittently operated bell or buzzer as well as a flashing light which illuminates the line-select button associated with the ringing line).

Seized.

To answer a call the subscriber typically lifts the telephone handset from the hook and depresses the flashing line-select button. Lifting the handset closes the switches 15 and 25 while depressing the line select button closes the switches 23 and 27. The telephone network 29 is thereby connected across the T and R leads of the central office line, permitting line current $I_L$ to flow. The flow of line current terminates the application of ringing signals from the central office in the usual way. The closure of switches 23 and 25 grounds the A conductor terminal 19 (provided that the hold button has not been depressed). Thus, the seized condition is characterized by the presence of line current, the absence of ringing voltage and the grounding of the A conductor.

Hold.

To place an active call on "hold" the subscriber depresses the hold button on the face of the telephone set. Depression of the hold button releases the previously depressed line button. In order to avoid disconnecting a calling party at the central office, line current must be maintained in the hold condition to simulate a busy line. A line card circuit typically accomplishes this by connecting a shunt impedance (illustrated at 31 in FIG. 1) across the T and R leads by closing a switch 17. Thus, in the hold condition, line current continues to flow, no ringing voltage is present and the A conductor is ungrounded.

The conditions existing during the idle, ringing, seized and hold states are indicated at the left in the chart of FIG. 2. At the right in FIG. 2, it is shown how two relays, R1 and R2, each provided with both normally open and normally closed contacts, are capable of providing all of the switching functions needed during each of the four distinct states. (In the schematic of FIG. 3, only one set of contacts is shown for each of the two relays R1 and R2, but as many contacts can be associated with each relay winding as are required to provide the desired switching functions.) For example, the function of switch 17 shown in FIG. 1 (which connects the impedance 31 across the T and R leads only during the hold condition) may be provided by the series combination of normally open contacts on the two relays. Similarly, the audible or visual ringing annunciators which are operated only during the ringing state may be energized through the series combination of normally open contacts on the first relay and normally closed contacts on the second relay.

Figure 3:
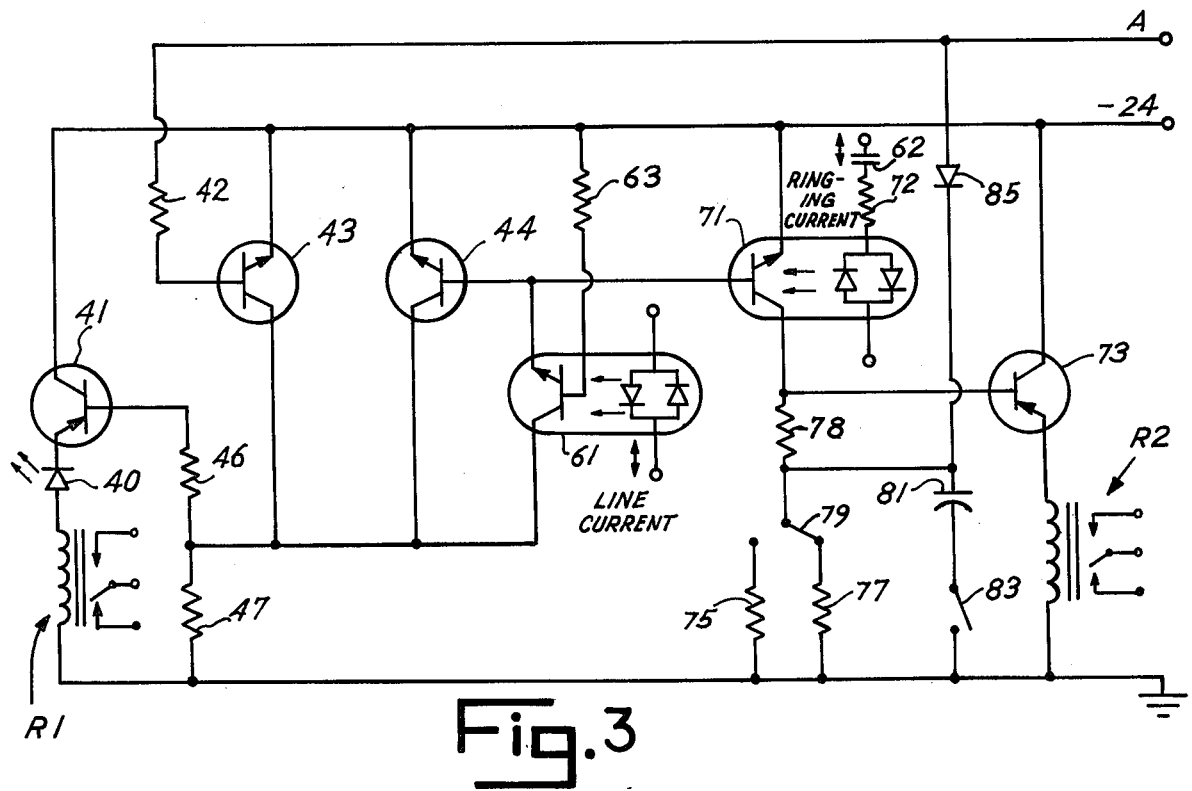
FIG. 3 is a detailed schematic drawing of a line card circuit which embodies the principles of the present invention.

An improved line card circuit embodying the principles of my present invention is shown in FIG. 3 of the drawings. The solenoid windings of the two controlled relays are indicated at R1 and R2. The winding of relay R1 is connected in series with a light-emitting diode 40 and the emitter-collector path of a transistor 41 between a −24 volt power source and ground. Transistor 41 becomes conductive when its base is driven negatively by the conduction of either transistor 43 or transistor 44. The emitters of both transistor 43 and 44 are connected to the negative supply and their collectors are connected to the junction of resistors 46 and 47 which together form a voltage divider connected between the base of transistor 41 and ground.

Transistor 43 conducts whenever the A conductor terminal (shown at 19 in both FIGS. 1 and 3) is grounded. Transistor 44 which, when conducting, also actuates the relay R1 through transistor 41, is driven by the light-responsive transistor switch portion of an optical semiconductor 61. The collector-emitter path of the transistor in device 61 is connected between the base and collector of transistor 44 and its base is connected via resistor 63 to the −24 volt supply. The other portion of the optical semiconductor 61 comprises a pair of back-to-back light-emitting diodes which are serially connected with either the T or R lead. Thus, when line current flows (in either direction), one of the two light-emitting diodes in the device 61 illuminates the light-responsive semiconductor switch, rendering it conductive and supplying forward base current to the transistor 44.

A second optical semiconductor device 71 includes back-to-back light-emitting diodes which are connected in series with a current limiting resistor 72 and DC blocking capacitor 62 across the T and R leads. AC ringing current, when present, illuminates these two diodes in alternation to render the semiconductor switch portion of the device 71 conductive, consequently forward biasing the transistor 73 whose emitter-collector path connects the solenoid winding of relay R2 between ground and the −24 volt supply. The structure and operation of commercially available optical semiconductor devices suitable for use in accordance with the invention are described in the *General Electric Optoelectrics Manual*, by W. H. Sahm; G.E., Syracuse, N.Y. (1976).

A timing circuit (to be discussed) includes a pair of resistors 75 and 77, one of which is connected in series with a resistor 78 between ground and the base of transistor 73 by the jumper connection 79. A timing capacitor 81 is connected between the jumper connection 79 and ground by the normally closed contacts 83 (which are opened whenever the solenoid of relay R1 is energized).

As noted earlier, in the idle state neither ringing voltage nor line current is present and the A conductor terminal 19 is ungrounded. As a result, all of the transistors in the line card circuit are non-conductive and the line card circuit consumes no operating current at all when its associated line is idle.

When a ringing signal appears, the optical semiconductor device 71 is activated, forward biasing transistor 73 and turning relay R2 ON. Relay R1 remains OFF.

The ringing signal from the central office is intermittent and transistor 71 is hence turned alternately ON and OFF during the ringing state. Transistor 73 remains conductive, however, because its forward bias is maintained by the capacitor 81 which is operatively connected in the circuit by the normally closed relay contacts 83. (These contacts are opened when relay R1 is ON during the seized and hold states.)

In the seized condition the A conductor terminal 19 is grounded, line current flows, and ringing voltage from the central office is terminated. The grounding of the A terminal 19 causes transistor 43 to conduct and actuates the relay R1 by switching transistor 41 into conduction. The conduction of transistor 43 caused by the grounding of the A conductor 19 also disables the optical semiconductor 61 during the seized condition. When transistor 43 conducts, a near −24 volt potential is present at the collectors of transistors 43, 44, and the transistor portion of the device 61. Thus, an insufficient voltage is present to operate the device 61, even though line current is flowing, and hence the forward biasing current which would otherwise flow to the base of the transistor in device 71 is cut off. Thus, device 71 does not conduct during the seized condition, the transistor 73 is held OFF, and relay R2 is not energized. Prompt shut off of the R2 relay is assured by the diode 85 which is connected from the A conductor to the junction of capacitor 81 and resistor 78. Diode 85 prevents the charge stored on capacitor 81 from delaying the turn off of transistor 73 until the relay contacts 83 are opened by the actuation of relay R1. Thus, as indicated in FIG. 2, relay R1 is ON and relay R2 is OFF during the seized condition.

When the system enters the hold state, ground is removed from the A conductor terminal 19 but line current continues to flow. The removal of the A conductor turns off transistor 43 and restores the operating potential at the collector of device 61. The presence of continued line current activates the optical semiconductor 61 which in turn holds the semiconductor switch portion of device 71 as well as transistor 44 in conduction, maintaining both relays R1 and R2 in their ON condition.

In the hold condition, the A conductor is ungrounded, diode 85 does not conduct, and capacitor 81 is inoperative because relay contacts 83 are open.

It may thus be seen that the transistor 43 performs two functions during the seized condition. When the A conductor 19 is grounded, it turns ON the transistor 41 to energize the relay R1 and it disables the line current detecting device 61 to prevent the transistor switch of device 71 from conducting to energize relay R2.

Transistor 44 operates only during the hold condition, amplifying the signal from device 61 to bias transistor 41 into conduction, thus energizing the relay R1.

The transistor portion of device 71 operates as an "OR-gate", becoming conductive in the ring condition when it is illuminated by ringing signals flowing through the adjacent diodes, and when its base is forward biased during the hold condition by the no longer disabled line current detecting device 61.

The diode 40 which is connected in series with the solenoid winding of relay R1 is placed in a visible position on the line card so that, when it lights in the seize and hold states, maintenance personnel may be informed that the line card is currently handling an active call. In addition, during the ringing condition, the base-emitter current flowing in transistor 71 is adequate to cause transistor 41 to become partially conductive, causing diode 40 to flicker (without actuating relay R1). In this way, maintenance personnel are also alerted when an incoming call is ringing the associated line.

In accordance with a feature of the invention, the transistors 41, 43, 44 and 73 and the optical semiconductors 61 and 71 are interconnected in a direct-coupled relationship which is compatible with integrated circuit construction techniques. Moreover, the light-emitting diodes of optical device 61 (which are connected in series with the tip or ring lead to sense line current) exhibit small voltage drops, even under current surge conditions caused by lighting or the like. In contrast, prior line card circuits have typically employed relay windings connected in series with the line which are subject to potentially damaging inductive voltage build-up during such current surges.

When constructed of discrete components, the circuit shown in FIG. 3 satisfactorily performs as intended using the element values listed below:

| COMPONENT | DESCRIPTION |
| --- | --- |
| Transistors 41 and 73 | 2N4250 or equivalent |
| Transistors 43 and 44 | 2N3569 or equivalent |
| Optical Semiconductors 61 and 71 | H11AA2 or equivalent |
| Diode 85 | 1N4148 or equivalent |
| Diode 40 | L.E.D. NSL 5053 |
| Resistor 42 | 8.2K |
| Resistor 46 | 22K |
| Resistor 47 | 3.0K |
| Resistor 63 | 68K |
| Resistor 72 | 6.8K, ½watt |
| Resistor 75 | 300K |
| Resistor 77 | 75K |
| Resistor 78 | 1K |
| Capacitor 62 | 1 ufd., 250 volt |
| Capacitor 81 | 47 ufd., 35 volt |
| Relays R1 and R2 | 6 PDT 24v DC, 750 ohm, coil |

Using the values for the timing circuit resistors 75 and 77 specified above, time out occurs approximately 6 seconds after the last C.O. ringing signal using resistor 77, or in approximately 12 seconds using resistor 75.

It is to be understood that the specific circuit which has been described is merely illustrative of one application of the principles of the present invention. Numerous modifications may be made to the circuit described without departing from the true scope and spirit of the invention.

What is claimed is:

1. In combination with a key telephone system in which a telephone station-set is linked to a central exchange by at least one transmission line and in which said station-set includes switching means for applying an operating signal to a control conductor whenever said station-set is actively connected to said line, a line card circuit for supervising the operation of said line which comprises, in combination, first and second relays, a first optical semiconductor coupling device having an input circuit operatively connected to said line and an output circuit operatively connected to energize said first relay upon the occurrence of ringing signals on said line, a second optical semiconductor coupling device having an input circuit operatively connected in series with said line and having an output circuit operatively connected to energize both said first and said second relays when line current flows in said line, and a transistor switching circuit having its input connected to said control conductor for disabling said second optical semiconductor coupling device whenever said operating signal is present on said control conductor.

2. The line card circuit set forth in claim 1 wherein said first optical semiconductor coupling device comprises at least one light emitting diode connected to said line and being positioned to illuminate a light-responsive transistor, said light responsive transistor having a base electrode connected to the output of said second optical semiconductor coupling device.

3. In a key telephone system in which a telephone station-set is linked to a central exchange by a transmission line, said station-set being provided with switching means for energizing a control conductor whenever said station set is actively connected to said line, a semiconductor line circuit for actuating first and second line supervising relays which comprises, in combination, a first light-emitting diode positioned adjacent a first light-responsive transistor, said diode being connected to said line to detect ringing signals thereon and to illuminate said first transistor when said ringing signals are present, said first transistor having a base electrode connected to the output of a second light-responsive transistor, a second light-emitting diode positioned adjacent said second light-responsive transistor, said second diode being connected to said line to illuminate said second transistor when line current is present on said line, and a third transistor connected to disable said second transistor whenever said control conductor is energized, said first relay being operatively connected to the output of said first transistor and said second relay being operatively connected to the outputs of said second and third transistors.

* * * * *